(12) United States Patent
Perkinson

(10) Patent No.: US 8,784,055 B2
(45) Date of Patent: Jul. 22, 2014

(54) PROPELLER PITCHLOCK UN-LOCKING DEVICE

(75) Inventor: Robert H. Perkinson, Somers, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 788 days.

(21) Appl. No.: 12/956,400

(22) Filed: Nov. 30, 2010

(65) Prior Publication Data
US 2012/0134800 A1      May 31, 2012

(51) Int. Cl.
*B64C 11/38*      (2006.01)
(52) U.S. Cl.
USPC ............................................... 416/1; 416/46
(58) Field of Classification Search
USPC ............................................................ 416/1
See application file for complete search history.

(56) References Cited

U.S. PATENT DOCUMENTS

| | | |
|---|---|---|
| 2,703,148 A | 3/1955 | Pearl |
| 3,080,928 A | 3/1963 | Godden et al. |
| 5,186,608 A * | 2/1993 | Bagge ............................ 416/37 |
| 2007/0212220 A1* | 9/2007 | Perkinson et al. .............. 416/46 |

FOREIGN PATENT DOCUMENTS

| | | |
|---|---|---|
| GB | 683786 A | 12/1952 |
| GB | 833470 A | 4/1960 |

* cited by examiner

*Primary Examiner* — Nathaniel Wiehe
*Assistant Examiner* — Brian O Peters
(74) *Attorney, Agent, or Firm* — Cantor Colburn LLP

(57) ABSTRACT

A propeller system includes a plurality of propeller blades and a pitch lock mechanism operably connected to the plurality of propeller blades. The pitch lock mechanism includes a pitch lock chamber and a pitch lock piston located in the pitch lock chamber biased toward a locked position when there is insufficient pressure in the pitch lock chamber thereby locking the pitch of the plurality of propeller blades. The propeller system includes a pitch unlock mechanism including a pitch unlock housing and a pitch unlock piston disposed in the pitch unlock housing. A fitting extends through the propeller system to the pitch unlock housing and introduction of fluid flow into the pitch unlock housing through the fitting urges the pitch unlock piston into contact with the pitch lock piston to overcome the bias of the pitch lock piston thereby unlocking the pitch of the plurality of propeller blades.

11 Claims, 5 Drawing Sheets

PROPELLER PITCHLOCK UN-LOCKING DEVICE

BACKGROUND OF THE INVENTION

The subject matter disclosed herein relates to propeller systems. More specifically, the subject disclosure relates propeller blade pitch lock systems. Propeller-driven craft, for example, airplanes, helicopters or hovercraft, often include pitch change mechanisms that allow for the pitch of the propeller blades to be changed depending on, for example, operating conditions, to increase performance of the propeller. Such systems are typically hydraulically-actuated and have a fail-fixed (or pitch-lock) feature in which the pitch of the propeller blades is locked in position in the event of a hydraulic failure.

In some instances, it is desirable to provide a device to adjust the pitch of the propeller blades of such a hydraulic system even after a hydraulic failure occurs engaging the pitch-lock feature.

BRIEF DESCRIPTION OF THE INVENTION

According to one aspect of the invention, a propeller system includes a plurality of propeller blades and a pitch lock mechanism operably connected to the plurality of propeller blades. The pitch lock mechanism includes a pitch lock chamber and a pitch lock piston located in the pitch lock chamber biased toward a locked position when there is insufficient pressure in the pitch lock chamber thereby locking the pitch of the plurality of propeller blades. The propeller system includes a pitch unlock mechanism including a pitch unlock housing and a pitch unlock piston disposed in the pitch unlock housing. A fitting extends through the propeller system to the pitch unlock housing and introduction of fluid pressure into the pitch unlock housing through the fitting urges the pitch unlock piston into contact with the pitch lock piston to overcome the bias of the pitch lock piston thereby unlocking the pitch of the plurality of propeller blades.

According to another aspect of the invention, a pitch unlock mechanism for a propeller system includes a pitch unlock housing and a pitch unlock piston located in the pitch unlock housing in operably communication with a pitch lock piston of the propeller system. A fitting extends through the propeller system to the pitch unlock housing and introduction of fluid flow into the pitch unlock housing through the fitting urges the pitch unlock piston into contact with the pitch lock piston to overcome the bias of the pitch lock piston thereby unlocking the pitch of the plurality of propeller blades.

According to yet another aspect of the invention, a method of adjusting a pitch of a plurality of propeller blades of a propeller system includes urging a fluid flow into a propeller system via a fitting extending through the propeller system and flowing the fluid through the fitting into a pitch unlock housing. The pitch unlock housing is pressurized to urge a pitch unlock piston into contact with a pitch lock piston. The motion of the pitch unlock piston overcomes a bias of the pitch lock piston thereby moving the pitch lock piston to an unlocked position. Propeller blades of the plurality of propeller blades are moved to a desired position thereby adjusting a pitch of the plurality of propeller blades.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
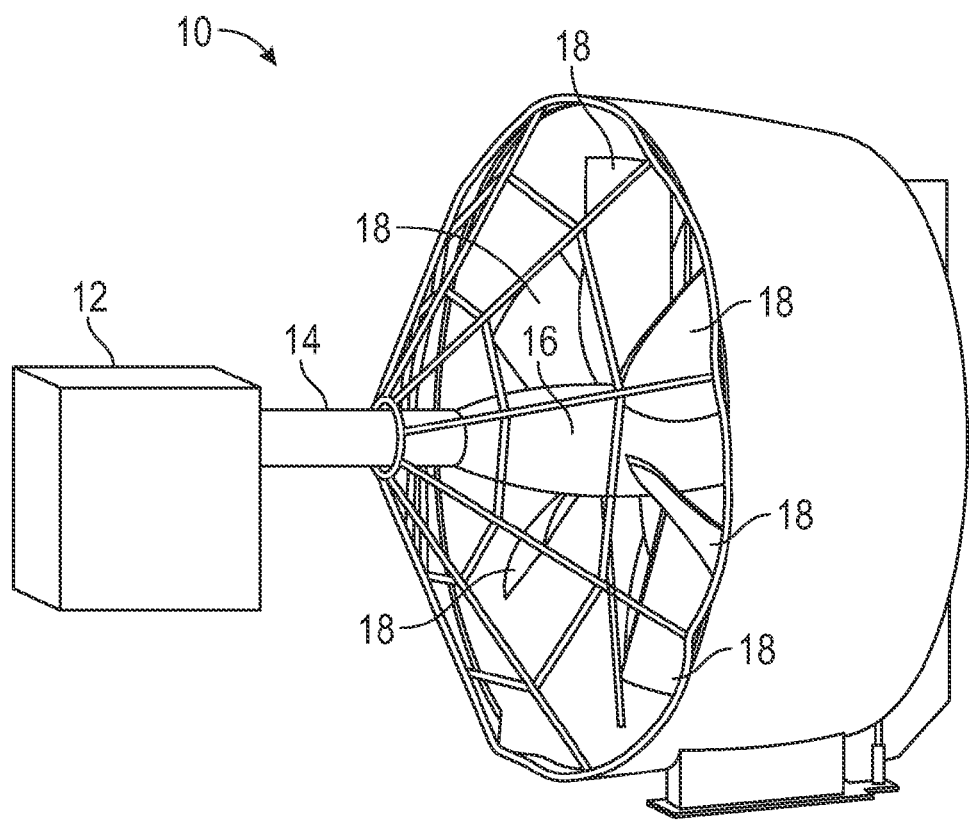
FIG. 1 is a perspective view of an embodiment of a propeller system.

Shown in FIG. 1 is a perspective view of a propeller system 10 driven by, for example, a gas turbine engine 12. The propeller system 10 may be for an aircraft, helicopter, hovercraft, or the like. The engine 12 drives a propeller shaft 14 which rotates a hub assembly 16 and a plurality of propeller blades 18 which extend therefrom.

Figure 2:
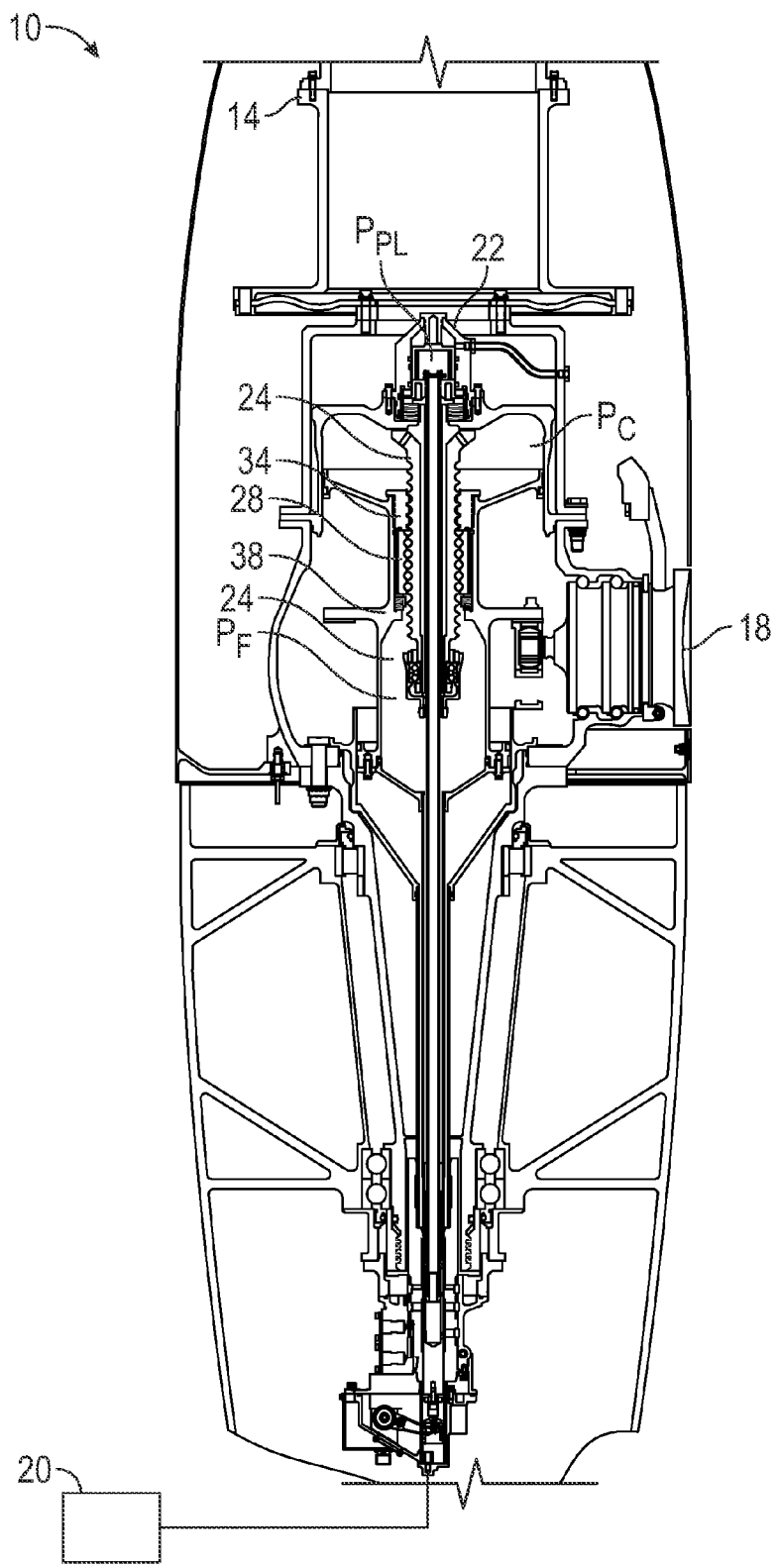
FIG. 2 is a cross-sectional view of an embodiment of a propeller system.

Referring now to FIG. 2, a cross-sectional view of the propeller system 10 is illustrated. A fluid transfer housing 20 is connected to the propeller system 10 and provides a pressure from a pressure source (not shown), for example, hydraulic pressure to areas designated as $P_C$ (coarse pitch pressure), $P_F$ (fine pitch pressure) and $P_{PL}$ (pitch lock pressure). Pitchlock pressure $P_{PL}$ is communicated to a pitchlock system 22, while the coarse pitch pressure $P_C$ and the fine pitch pressure $P_F$ are communicated to a pitch change system 24.

Figure 3:
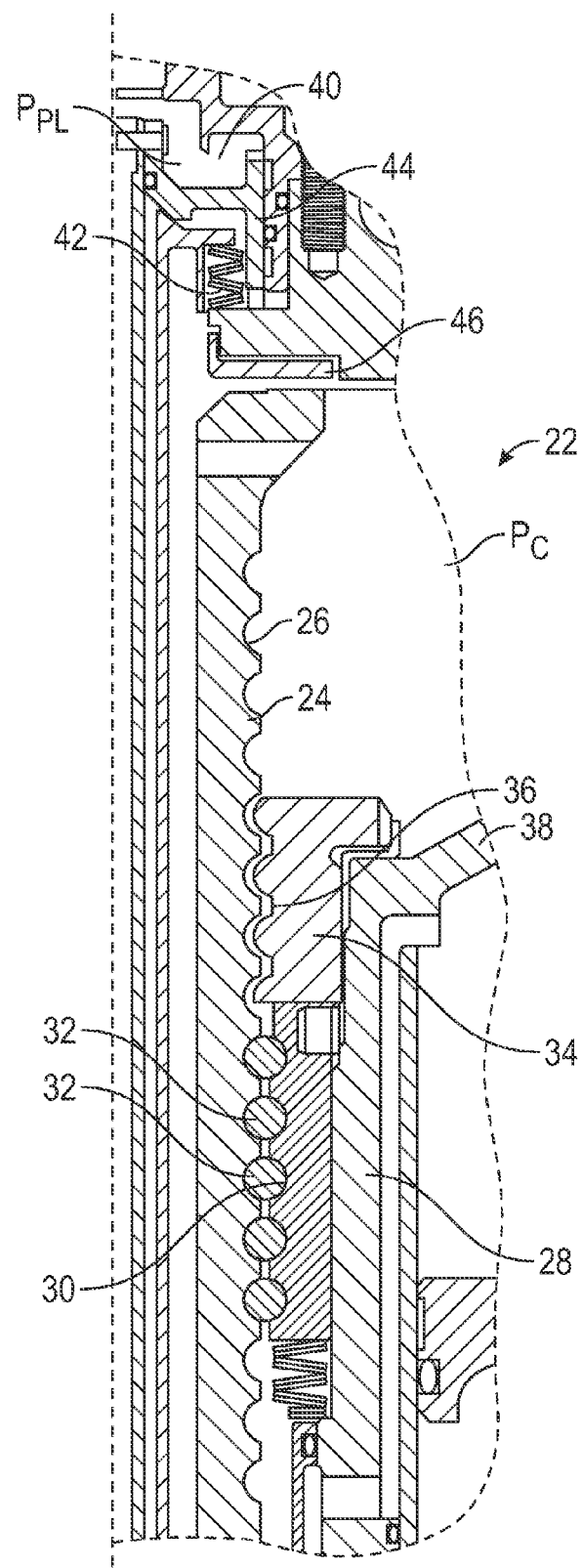
FIG. 3 is another cross-sectional view of an embodiment of a propeller system.

Referring to FIG. 3, the pitch lock system 22 includes a pitch lock ballscrew 24 having a helical ballscrew thread 26 and a ballnut 28 having complimentary ballnut threads 30 such that a plurality of ball bearings 32 are located between the ballscrew threads 26 and the ballnut threads 30. A pitchlock nut 34 is located at one axial end of the ballnut 28 and has a pitchlock nut thread 36 complimentary to the ballscrew thread 26. The ballscrew 24, ballnut 28 and pitchlock nut 34 are disposed and configured such that during normal operation, the ballscrew 24 rotationally axially advances or retreats through the ballnut 28 and pitchlock nut 34 over the length of the ballscrew 24. The travel is in response to differential pressures $P_C$ and $P_F$ driving axial travel of a pitch change yoke 38 which results in a pitch change of the plurality of propeller blades 18.

Figure 4:
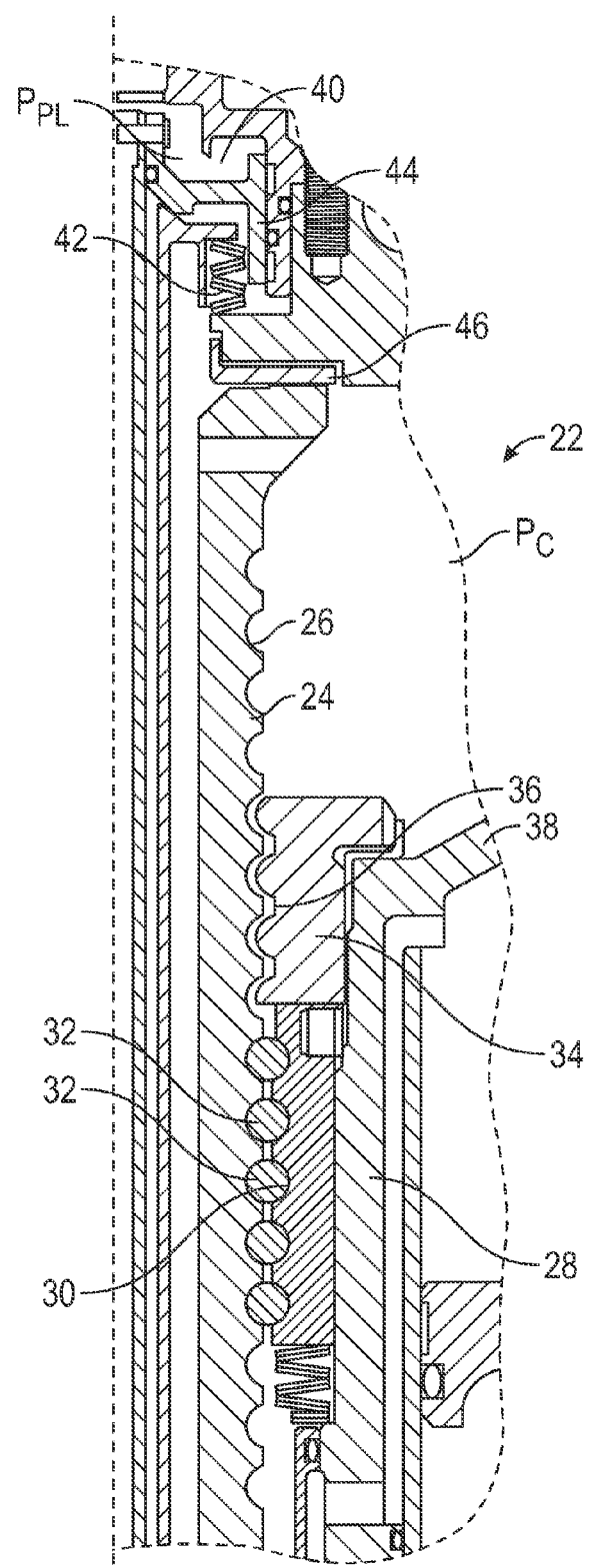
FIG. 4 is a cross-sectional view of an embodiment of a propeller system in a pitch-locked position.

In the event of a hydraulic pressure failure, pressure in a pitch lock chamber 40 drops to an extent such that a pitch lock spring 42 biases a pitch lock piston 44 into a locked position, as shown in FIG. 4. This action urges the ballscrew 24 into a locked position against an actuator dome cover 46 and generates an axial and torsional resistance which ground the ballscrew 24 such that pitch of the plurality of propeller blades 18 is substantially locked.

Figure 5:
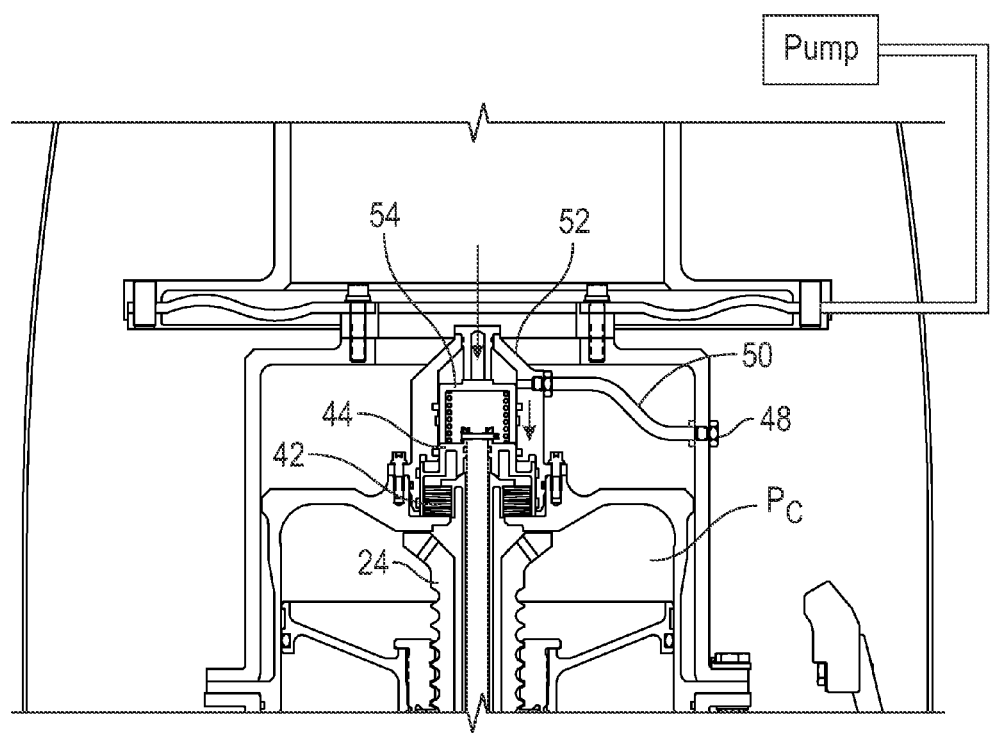
FIG. 5 is another cross-sectional view of an embodiment of a propeller system in a pitch-locked position.

Referring now to FIG. 5, in many instances it may be desirable to change the pitch of the plurality of propeller blades 18 and continue operation of the propeller system 10 after such a hydraulic failure. A device to perform such a pitch change is shown in FIG. 5. A hydraulic fitting 48 is provided at an external location on the propeller system 10. From the hydraulic fitting 48, a line 50 extends to a pitch unlock housing 52, in which a pitch unlock piston 54 is located. The pitch unlock piston 54 is substantially abutting the pitch lock piston 44 when the pitch lock piston 44 is in the locked position, as shown in FIG. 5. When a sufficient hydraulic pressure is introduced through the hydraulic fitting 48 from, for example, a manual pump or auxiliary hydraulic supply, into the pitch unlock housing 52, the pitch unlock piston 54 is urged axially into contact with the pitch lock piston 44 and overcomes the bias of the pitch lock spring 42. This forces the ballscrew 24 into its unlocked, or normal operating position. With the ballscrew 24 in this position, the plurality of blades 18 may be manually pitch-adjusted to achieve a desired pitch. Once the desired blade pitch is attained, the hydraulic source is disconnected from the hydraulic fitting 48 and the pitch unlock housing 52 is depressurized, thus returning the components of the pitch lock system 22 to their respective locked positions and locking the plurality of propeller blades 18 in the desired pitch position. It is understood that the afore described procedure is accomplished while the propeller is not rotating. Once the propeller blades 18 have been repositioned to a desired position, the propeller may then be used to provide propulsion in a fixed pitch mode of operation.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A propeller system comprising:
   a plurality of propeller blades;
   a pitch lock mechanism operably connected to the plurality of propeller blades including:
      a pitch lock chamber; and
      a pitch lock piston disposed in the pitch lock chamber biased into a locked position when there is insufficient pressure in the pitch lock chamber thereby locking the pitch of the plurality of propeller blades; and
   a pitch unlock mechanism including:
      a pitch unlock housing;
      a pitch unlock piston disposed in the pitch unlock housing; and
      a fitting extending through the propeller system to the pitch unlock housing;
      wherein introduction of fluid flow into the pitch unlock housing through the fitting urges the pitch unlock piston into contact with the pitch lock piston moving the pitch lock piston away from the locked position thereby unlocking the pitch of the plurality of propeller blades.

2. The propeller system of claim 1 wherein the fluid flow comprises hydraulic fluid.

3. The propeller system of claim 2 wherein the fluid flow is from a manual pump or an auxiliary hydraulic source.

4. The propeller system of claim 1, comprising a ballscrew rotatable in a ballnut when the pitch lock mechanism is in an unlocked position.

5. The propeller system of claim 4, comprising a pitch change yoke operably connected to the ballnut to drive travel of the ballnut relative to the ballscrew.

6. The propeller system of claim 5, wherein the pitch change yoke is operably connected to the plurality of propeller blades.

7. A pitch unlock mechanism for a propeller system comprising:
   a pitch unlock housing;
   a pitch unlock piston disposed in the pitch unlock housing in operably communication with a pitch lock piston of the propeller system; and
   a fitting extending through the propeller system to the pitch unlock housing;
   wherein introduction of fluid flow into the pitch unlock housing through the fitting urges the pitch unlock piston into contact with the pitch lock piston to move the pitch lock piston away from a locked position thereby unlocking the pitch of the plurality of propeller blades.

8. The pitch unlock mechanism of claim 7, wherein the fluid flow comprises hydraulic fluid.

9. The pitch unlock mechanism of claim 8, wherein the fluid flow is from a manual pump or an auxiliary hydraulic source.

10. A method of adjusting a pitch of a plurality of propeller blades of a propeller system comprising:
    locking a pitch of the propeller blades by moving a pitch lock piston of a pitch control system to a locked position via a failure of the pitch control system;
    pressurizing a pitch unlock housing by introducing a flow of fluid from an auxiliary supply into the pitch unlock housing;
    urging a pitch unlock piston into contact with the pitch lock piston via the pressurization;
    moving the pitch lock piston from the locked position to an unlocked position via the contact;
    manually pitch-adjusting the plurality of propeller blades; and
    depressurizing the pitch unlock housing to return the pitch lock piston to the locked position.

11. The method of claim 10, wherein the pitch of the plurality of rotor blades is adjusted while a propeller shaft is not rotating.

* * * * *